CODE COVERTER CONTROL

INVENTORS
CARL P. SPAULDING
BY MERTON CARR WILSON
Christie, Parker & Hale
ATTORNEYS INVENTORS
CARL P. SPAULDING
BY MERTON CARR WILSON
Christie, Parker & Hale
ATTORNEYS

United States Patent Office 3,133,279

Patented May 12, 1964

3,133,279

CODE CONVERTER CONTROL

Carl P. Spaulding, San Marino, and Merton Carr Wilson, Pasadena, Calif., assignors to Datex Corporation, Monrovia, Calif., a corporation of California Filed Apr. 13, 1959, Ser. No. 805,868

4 Claims. (Cl. 340—347)

Figure 1:
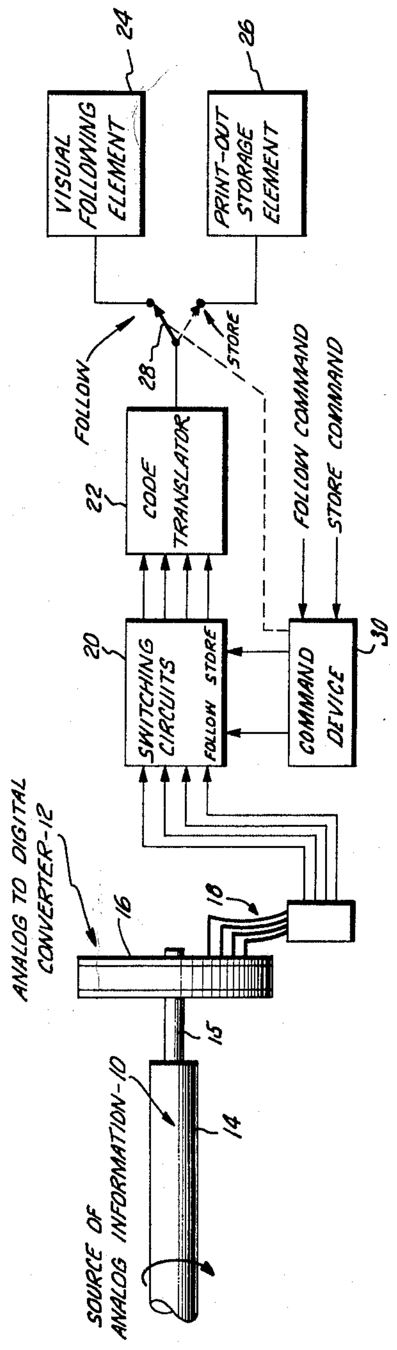

This invention relates to binary coded digital circuits and more particularly to analog-to-digital converters. In one of its more particular aspects, the invention relates to control apparatus for shaft position encoders.

This invention is related in one of its aspects to our earlier filed application entitled "Encoder Circuits" bearing Serial Number 794,873, filed February 24, 1959, now U.S. Patent Number 3,099,003, assigned to the same assignee as this invention and which comprises an improvement thereover.

The analog-to-digital converters or encoders presently in use continually sense a disk coded in terms of binary characters and provide corresponding binary coded signals representative of the encoder shaft position. These binary coded signals may be arranged to be continuously transmitted to the associated digital handling circuitry for application to a remote read-out device or visual display device. Since the encoder signals are continuously transmitted to the display device, the visual indications are continuously changing in accordance with the changes in analog information or encoder shaft position. This displayed information is then of a temporary nature. When these converters are employed for controlling processes, the samplings afforded by these binary coded signals are best handled in some readable permanent form. This requirement, therefore, necessitates that the information be retained or stored a sufficient amount of time to allow it to be recorded. This latter requirement further implies that the storage control apparatus utilized must handle the digital information in a mode compatible or adaptable for use with the print-out or permanent storage apparatus.

In general, encoders operate at high speeds and deliver binary coded signals in a parallel fashion relative to the slower operating print-out devices which generally receive and print the decoded information in serial form. This, then, places another restriction upon the control apparatus in order to make it compatible when the presently available commercial print-out equipment. Control circuits for encoders have been employed in the past to independently control the encoder signals for either visual or permanent display. It is desired, however, to provide control apparatus having all of the above-mentioned features in a single control circuit capable of both continuously transmitting the binary coded signals for visual samplings and to store them upon command for recording purposes.

This invention provides an improved control apparatus having the above enumerated features in a single control circuit. These desirable features are achieved through the provision of circuit means adapted to be coupled to an analog-to-digital converter, or any other source of digital signals, for continuously transmitting the digital signals to the associated data handling apparatus. This method of control will be termed the "follow" mode. The same circuitry is adapted for use in a "storage" mode wherein preselected binary coded signals are retained upon receiving a "store" command until a "follow" command is again initiated.

In one of the disclosed embodiments wherein the analog-to-digital converter takes the form of an encoder, the binary coded signals are derived from a coded disk mounted on a rotatable shaft responsive to the analog information. The disk has at least a single track thereon and is preferably arranged with a plurality of tracks to deliver the binary coded signals in a parallel circuit relationship. The encoder disk tracks comprise spaced conductive and non-conductive segments representative of binary coded characters which are continually sensed to provide the binary coded signals representative of the encoder shaft position and thereby represent the analog signal. The thus derived signals are delivered in a parallel fashion to a group of switching elements having two conductive conditions arranged to continuously change their conductive condition or binary state in response to the digital signals when the control apparatus has been placed in the "follow" mode. These switching elements are arranged to be controlled by a command element or toggle to place the switching elements in either the "follow" or "storage" mode. The placing of the command toggle in the "storage" mode causes the switching elements to remain in their present conductive condition and thereby retain or store the previously sensed encoder binary characters. This storage operation results, in accordance with this invention, by blocking or inhibiting the delivery of the subsequent encoder signals and simultaneously varying the circuit conditions of the switching elements to prevent or inhibit their switching action.

Figure 2:
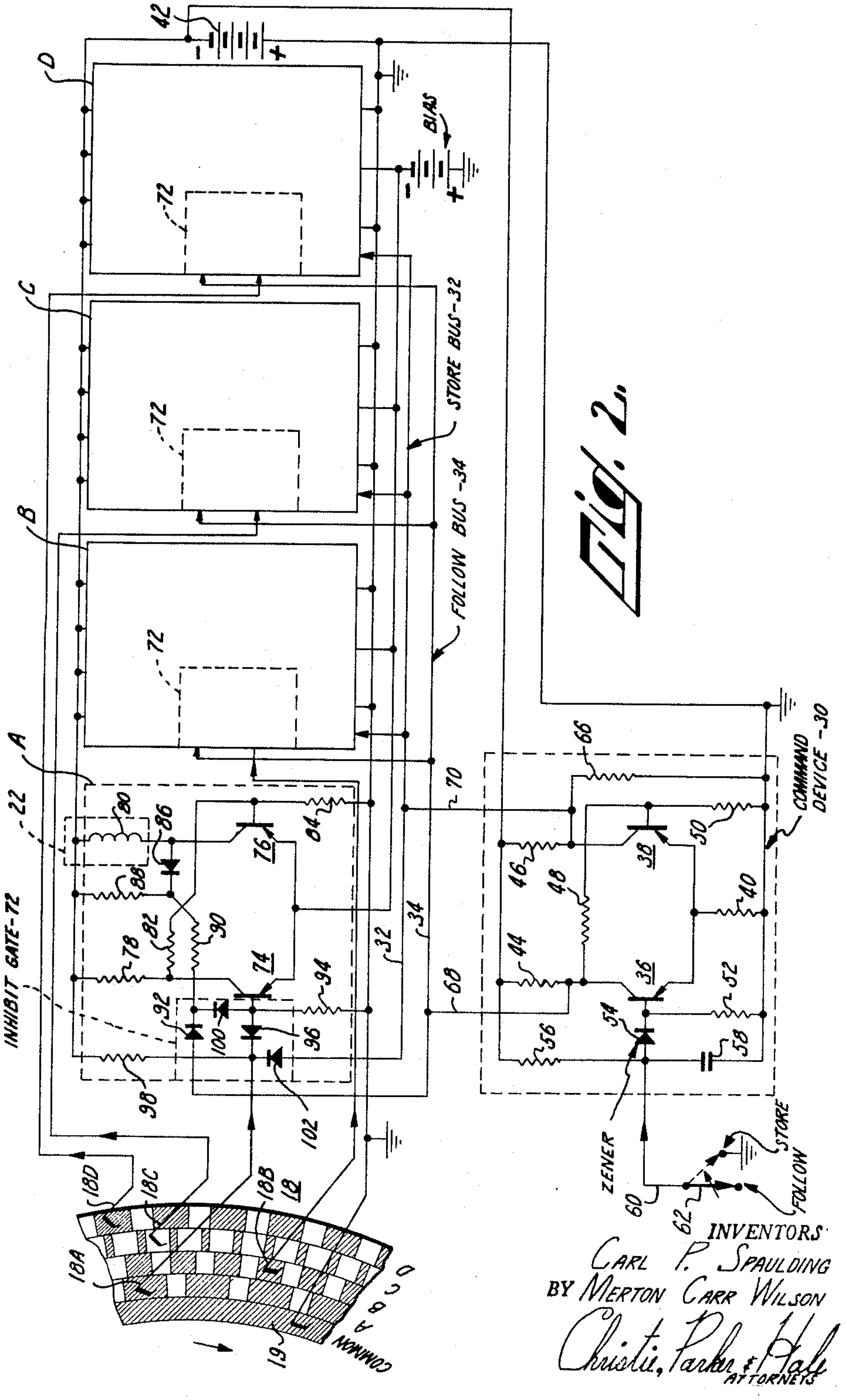

These and other features of the present invention may be more fully appreciated when considered in the light of the follwing specification and drawings, in which:

FIG. 1 is a block diagram of the digital control system embodying the invention; and FIG. 2 is a schematic-block diagram of the control apparatus, including a portion of the encoder illustrating the disk tracks, and the brushes therefor, as shown in FIG. 1.

Now, referring to FIG. 1, the digital system of this invention will be examined. The source of digital signals may be a combination of the source of analog signals 10 and an analog-to-digital converter 12. The analog source 10 is represented as a revolving shaft 14 from which the analog signal to be digitized by means of the converter 12 results. The converter 12 is shown as an encoder having a shaft 15 arranged coaxially with the rotatable shaft 14. The various positions of the encoder shaft 15 will be encoded by means of a disk 16 mounted thereon.

The disk 16 is arranged with a plurality of spaced segments of two different kinds shown as conductive and non-conductive segments arranged in a plurality of concentric tracks, a portion of which is shown in FIG. 2. The conductive and non-conductive segments may be coded to define binary characters, preferably but not necessarily arranged in terms of a cyclic code. The disk 16 is provided with a sensing element or a plurality of sensing brushes 18 arranged in continual engagement and in alignment with the tracks of the disk 16 for providing the output indications of the sensed segments. The sensing brushes 18 ride on the surface of the disk 16 and provide binary coded output indications in a parallel circuit fashion representative of the encoder shaft position.

These binary coded digital signals are in turn coupled to a group of parallel arranged switching circuits 20. The switching circuits 20 are arranged to either continuously follow the binary coded signals or to store the binary signals. In this instance the switching circuits 20 are coupled to a code translator 22 for receiving the output signals provided by the switching circuits 20 and for translating the signals in terms of a binary coded decimal for use in the associated read-out equipment. In this instance the read-out equipment is shown as a visual following element 24 and a print-out storage element 26 alternately arranged to receive the signals from the code translator 22 by means of a selector switch 28. The selector switch 28 is shown to be operative to connect the code translator 22 to the visual following element 24 when the switching circuits 20 are in the "follow" mode. In the same fashion, when the selector switch 28 is in the "store" mode, the signals from the code translator 22 are coupled to the print-out storage element 26. The control of the selector switch 28 as well as the operating mode of the switching circuits 20 is under the control of a command device 30. The command device 30 is arranged to be responsive to signals for placing the device in preselected states in accordance with the desired command and which states are effective to control the functioning of switching circuits 20 and the position of the selector switch 28.

Now, referring to FIG. 2, the circuit details of the control apparatus will be described more fully. The control apparatus is conveniently shown as four parallel switching elements A–D, with only the switching element A shown in detail, the elements B, C, and D being identical in structural organization and operation. It should be noted that the four elements A–D may conveniently define a decimal digit in terms of four binary bits.

Since the control of the switching elements A–D is governed by the command device 30, the operation thereof will be first described. The particular circuit configuration for the command device 30 illustrated in FIG. 2 is described and claimed in our earlier filed copending application bearing Serial Number 794,872, filed February 24, 1959, now U.S. Patent Number 3,099,002, and assigned to the same assignee as this application. The circuit disclosed in this latter-mentioned copending application has been modified for purposes of this invention by eliminating the "coarse" time delay arrangement along with the diode 56. It will be recognized from the description to follow that the function of these circuit elements are not needed for purposes of this invention. The essential function of the command device 30 is to provide a signal to condition switching elements A–D to function in either a "follow" or "storage" mode. Therefore, it will be evident that the command device 30 may take the form of any will known conventional bistable element including the Eccles-Jordan multivibrator circuit. Accordingly, the usual pair of output indications from a bistable circuit are derived from the command element 30 and delivered to the switching elements A–D by means of a pair of command busses identified as the "store" bus 32 and the "follow" bus 34.

The command device 30 illustrated comprises a pair of transistors 36 and 38 arranged as a bistable switching circuit to respond to the signals delivered as "follow" commands or "store" commands. The emitter for each of the transistors 36 and 38 are coupled to a common emitter resistive impedance means 40 having its opposite end connected to the positive terminal of the voltage source shown as a battery 42 or ground. The collector electrode for the transistor 36 is connected to a resistive impedance 44 having its remaining terminal connected to the negative side of the battery 42. The collector electrode for the transistor 38 is also connected to the negative terminal of the battery 42 by means of a similar collector resistive impedance 46. The collector electrode for the transistor 36 is cross-coupled to the base circuit for the transistor 38 through the provision of a voltage divider network which includes the resistive impedance 44 and resistive impedances 48 and 50. The resistive impedance means 48 is coupled between the collector electrode for transistor 36 and the base electrode for the transistor 38 while the resistive impedance element 50 is coupled intermediate the base electrode for the transistor 38 and ground. The base electrode for the transistor 36 is provided with a resistive impedance 52 connected thereto in common with the cathode of a Zener diode 54 and to ground. The Zener diode 54 is included in a time delay arrangement which also includes the resistive impedance means 56 and the capacitor 58. The resistive element 56 is connected to the anode of the diode 54 and to the negative terminal of the battery 42 while the capacitor 58 is also connected to the input circuit of diode 54 and to ground. The "follow" and "store" commands are coupled into the command device 30 by means of the leadwire 60 to set the device to the corresponding states. As illustrated, the leadwire 60 includes a command switch 62 which may be manually operated. The "follow" mode is commanded when the switch 62 is in an open circuit condition and the "store" mode is commanded when the switch 62 connects the leadwire 60 to ground. It should be understood that these commands may be automatically delivered to the command device 30 such as being under the control of the read-out apparatus. The collector circuit for the transistor 38 will also be seen to include the resistor 66 connected thereto and to ground. The leadwires 68 and 70 connected to the collectors of transistors 36 and 38 respectively couple the state of the command device 30 to the "follow" bus 34 and the "store" bus 32 respectively.

Briefly, the operation of the command device 30 is such that when the switch 62 is positioned for the "follow" mode, the input impedance to the Zener diode 54 will be very high so as to cause current to flow from the source 42, through the emitter and base circuit for the transistor 36, and in a reverse direction through the Zener diode 54, once the diode has broken down, and back to the opposite side of the source 42 by means of the resistor 56. This will cause saturation of the transistor 36 and in turn drive the transistor 38 to cut off. Accordingly, the voltage appearing on the leadwire 68, which is coupled to the "follow" bus 34, will be at substantially ground potential, while the leadwire 70 is at some negative potential below ground during this interval. Alternately, when the command switch 62 is placed in the "store" mode, the input circuit to the command device 30 will be connected to ground so as to prevent the breakdown of the Zener diode 54. This will cause the transistor 36 to be cut off and in turn cause the transistor 38 to conduct. The voltage conditions on the "store" bus 32 and the "follow" bus 34 will then be reversed, that is the "store" bus 32 will be at ground level and "follow" bus 34 at a negative potential. For a more complete description of the operation of the circuit shown for command device 30, reference may be had to the above-identified copending application, bearing Serial Number 794,872, U.S. Patent Number 3,099,002.

Each switching element A–D includes at the input circuit thereof, for receiving the digital indications derived by the brushes 18, from sensing the disk 16, an inhibiting circuit 72. The circuit configuration for the switching elements A–D is substantially the same as the circuits described in our above-mentioned copending application, Serial No. 794,873, U.S. Patent Number 3,099,003. This circuit is normally arranged in an asymmetrical fashion for transmitting the signals derived from the disk 16 or it is in a "follow" mode. The asymmetrical relationship is changed to a symmetrical circuit configuration when the circuit is conditioned for the "store" mode, as will become more evident hereinafter.

The switching circuit A comprises a pair of transistors 74 and 76 arranged to respond to the sensing of the conductive and non-conductive segments on the disk 16 to correspondingly switchably change between two conductive conditions. The emitter circuits for the transistors 74 and 76 are connected to the negative terminal of the bias source and which bias source has its positive terminal connected to ground. The collector electrode for the transistor 74 is connected to a resistitve impedance element 78 having its opposite end connected to the negative terminal of the battery 42. The collector electrode for the transistor 76 is connected in series circuit relationship with a relay winding 80 having its opposite end connected to the negative terminal of the battery 42. It should be noted that the relay winding 80 comprises a portion of the code translator 22 and that the conductive condition of the relay winding 80 is effective in combination with the remaining relay windings for the translator 22 to provide the desired code translation.

The transistor 74 is cross-coupled to the transistor 76 by means of a voltage divider network including resistor 78 and resistors 82 and 84 in the same fashion as described for the command device 30. The symmetrical circuit configuration for the element A results through the provision of the diode 86 connected to the collector electrode for transistor 76 and arranged in series circuit relationship with the resistor 88 connected to the negative terminal of battery 42. The diode 86 is also connected to the resistor 90, which is in turn coupled to the "follow" bus 34 by means of a diode 92. The base electrode for the transistor 74 is coupled to grouund by means of a resistive element 94. This latter element is exclusive of the inhibiting circuit 72 provided for the input to the transistor 74. The inhibiting circuit 72 is connected directly to the brush 18A providing the binary coded indications for this switching element. The inhibiting circuit 72 includes a diode 96 coupled intermediate the base electrode for the transistor 74 and which diode has its anode connected thereto and its cathode coupled in common with the input lead from brush 18A and a resistor 98 connected to the negative terminal of the battery 42. A diode 100 having its anode connected in common with the anode of diode 96 and its cathode in common with the cathode of the diode 92 is included in the inhibiting circuit 72 along with a diode 102 having its cathode electrode connected tn common with the cathode of diode 96 and its anode directly connected to the "store" bus 32.

With the above structure in mind, the operation of the switching elements A–D in both the "follow" and "store" modes will be described. Assuming initially that the command device 30 is in the "follow" mode, in which instance the "follow" bus 34 will be connected at ground potential, while the "store" bus 32 will be at some negative potential. It will then be recognized that the input signal to the element A will consist of the signal developed between the brush 18A and the common brush 19 for the common continuously conductive track on the disk 16. The voltage on the "follow" bus 34 will be effective to forward-bias the diode 92. The negative potential on the "store" bus 32 will back-bias the diode 102. The forward-bias on the diode 92 will in turn back-bias the diode 100. Accordingly, when no digital information is delivered to the switching element A, as is the case when the brush 18A is in engagement with a non-conductive segment, the transistor 74 will be in a conductive condition and will pass current through its emitter-base circuit by means of the diode 96 and the resistor 98. During this interval the transistor 76 will be cut off and the relay winding 80 will be de-energized as desired. When the disk 16 is rotated to a conductive segment, as shown, a contact closure occurs or a low impedance path is provided between brushes 18A and 19, and the input circuit to the element A is essentially connected to ground. This circuit condition causes the diode 96 to be back-biased and thereby prevents base current flow in the transistor 74. This will cause the transistor 74 to be cut off and place the base electrode for the transistor 76 at a negative potential, causing base current to be drawn through this transistor whereby the relay winding 80 is now energized. The energization of the relay winding 80 is indicative of the sensing of a different binary character on the disk 16. With the continued rotation of the disk 16 and the command device 30 in the "follow" mode, the sensed binary characters will be continuously transmitted. It should be recognized that the elements B–D receive their digital signals from brushes 18B–18D respectively and also continuously transmit these signals during this interval, providing the four binary bits necessary to define a decimal digit in the translator 22.

When the command device 30 is placed in a "store" mode, the voltage on the "store" bus 32, as a result of transistor 38 conducting, will be essentially at ground potential level. This essentially clamps the input circuit for the element A to ground by means of the diode 102 and back-biases the diode 96. This circuit condition acts to inhibit the delivery of subsequent signals to the switching elements A–D. Therefore, under these conditions the conductive condition of the element A will depend upon the biasing of the diode 100. Assuming that no data or a non-conductive segment was sensed prior to placing the command device 30 in the "store" mode, the transistor 74 will conduct through the diode 100 by means of the circuit path provided by resistors 90 and 88. Accordingly, the relay winding 80 will be de-energized as representative of the non-conductive state of the transistor 76. The provision of this latter-mentioned circuit path arranges the element A in a symmetrical relationship and is necessary since the path through the resistor 98 is blocked as a result of back-biasing the diode 96. It should be noted that the diode 86 is utilized to prevent the current of transistor 74 from energizing the relay coil 80 and that this current is passed through the resistor 88.

When the brush 18A senses a conductive segment on the disk 16 just prior to placing the command device 30 in the "store" mode, the transistor 76 will be conducting and thereby maintaining the relay winding 80 energized. With the transistor 76 conducting, the controlling diode 100, mentioned above, will be back-biased, while the diode 86 will be forward-biased. With the diode 100 back-biased, the base current flow in transistor 74 is prevented and causes this transistor to be cut off. It will now be seen that the signal representative of a sensed conductive segment delivered to the element A just prior to the operation of the command device 30 will be retained while the subsequent digital signals are inhibited.

The stored signals may be retained for any length of time necessary for the functioning of the read-out equipment including the serial recording of each decimal digit from the code translator 22.

It will now be seen that this invention has advanced the state of the art through the provision of a single circuit capable of continuously transmitting or storing binary coded signals upon command.

What is claimed is:

1. Control apparatus including circuit means adapted to be continuously operative for receiving a plurality of binary coded signals and to either continuously follow and indicate the changes in the binary character of the received signals or to store the received signals and continuously indicate the binary character of the stored signals; said circuit means comprising a plurality of switching elements each having conductive and non-conductive conditions for indicating the binary character of an individual signal and adapted to be conditioned for asymmetrical operation as a monostable circuit to continuously follow the binary changes in the received signals or for symmetrical operation as a bistable circuit for storing a preselected group of signals without following subsequent changes in the binary character of the received signal, and individual inhibiting circuit means connected to said switching elements for coupling an individual signal from a signal source to an individual switching element, and control circuit means operable to provide a pair of control signals coupled to said single circuit means for conditioning said switching elements to operate in said asymmetrical fashion or conditioning said elements to operate in said symmetrical fashion while substantially simultaneously conditioning said input circuit means for inhibiting the coupling of the signals to said switching elements when operating in a bistable fashion.

2. Control apparatus as defined in claim 1 wherein the binary signals and the store control signals are combined to inhibit the application of subsequently received signals to said switching elements.

3. Control apparatus including circuit means adapted to be continuously operative for receiving a plurality of binary coded signals and to either continuously follow and indicate the changes in the binary character of the received signals or to store the received signals and continuously indicate the binary character of the stored signals; said circuit means comprising a plurality of switching elements each having conductive and non-conductive conditions for following and indicating the binary character of the received signals and each arranged to be conditioned for operation as a monostable circuit to continuously follow the changes in the binary character of the received signals or as a bistable circuit for storing a preselected group of signals without being responsive to subsequent changes of the signals, and individual input circuit means connected to said switching elements for coupling the signals from a signal source to an individual switching element, and control circuit means operable to provide a pair of control signals coupled to said single circuit means for conditioning all of said switching elements to operate in a monostable fashion or conditioning said elements to operate in a bistable fashion while substantially simultaneously conditioning said input circuit means for inhibiting the coupling of the signals to said switching elements when operating in a bistable fashion.

4. Control apparatus including single circuit means adapted to be continuously operative for receiving a plurality of binary coded signals and to either continuously follow and indicate the changes in the binary character of the received signals or to store a preselected group of signals, said circuit means comprising a plurality of switching elements having conductive and non-conductive conditions and arranged to be conditioned for operation in an asymmetrical fashion to continuously follow and indicate the changes in the received signals or in a symmetrical fashion for storing a preselected group of signals without following the changes in the received signal, and individual input circuit means connected to said switching elements for coupling the signals from a binary source of signals to said switching elements, and control circuit means coupled to said individual input circuit means for switchably conditioning all of said switching elements to operate in an asymmetrical fashion or conditioning said elements to operate in a symmetrical fashion while substantially simultaneously conditioning said input circuit means to inhibit the signals coupled to said switching elements when the switching elements are storing a group of signals.

References Cited in the file of this patent

UNITED STATES PATENTS

| | | |
|---|---|---|
| 2,775,754 | Sink | Dec. 25, 1956 |
| 2,793,807 | Yaeger | May 28, 1957 |
| 2,873,441 | Miller | Feb. 10, 1959 |
| 2,907,003 | Hobbs | Sept. 29, 1959 |